FIG. I

INVENTOR.
JOSEPH C. BRENEMAN
BY Hamilton & Cook
ATTORNEYS

Oct. 31, 1967  J. C. BRENEMAN  3,349,432
CONTINUOUS MIXING MACHINES

Filed Sept. 3, 1965  3 Sheets-Sheet 2

INVENTOR.
JOSEPH C. BRENEMAN
BY Hamilton & Cook
ATTORNEYS

United States Patent Office 3,349,432
Patented Oct. 31, 1967

3,349,432
CONTINUOUS MIXING MACHINES
Joseph C. Breneman, Wooster, Ohio, assignor to Rubbermaid Incorporated, Wooster, Ohio, a corporation of Ohio
Filed Sept. 3, 1965, Ser. No. 484,961
5 Claims. (Cl. 18—2)

ABSTRACT OF THE DISCLOSURE

A continuous mixing machine for mixing particles of rubber or elastomeric materials having twin rotor screw members mixing, conveying and extruding the materials outwardly through a discharge orifice having walls of thermoplastic material supported at their ends and having a low coefficient of friction compatible with the mixed material, whereby to control the temperature of the material being discharged without requiring circulation of a heat transfer medium in said walls.

---

The present invention relates generally to mixing equipment for masticating, compacting, and/or extruding elastomers, stiff gelatin materials, or the like. More particularly, the invention relates to machines for mixing rubber particles, pigments, fillers, and the like; and, specifically, to continuous mixers of the type which continuously perform the combined operations of a Banbury or batch-type mixer-masticator and of a low pressure extruder.

Continuous mixers of the type described commonly employ a pair of side-by-side rotatable working shaft members disposed within, extending through, and journaled at the ends of a casing. The mixer casing has a feed box or opening at its first end through which the mixer is charged with raw materials, such as crumb rubber, powdered fillers and accelerators, oils, and similar materials and chemicals. The mixer's rotatable shaft members may be formed, at the first or feed box end, into mixing and masticating rotor portions. These rotor portions may integrally join with rotor screw portions formed on the shaft members and extending to the other or second end of the casing. The rotor screw portions convey and extrude the mixed and masticated material or stock through the plenum end of the chamber defined by the interior of the casing to a discharge orifice at the second end of the casing. (For disclosure of further details of such continuous mixers, reference may be made to U.S. Patent No. 3,154,808.)

The conveying or extruding of such stocks through the plenums of such continuous mixers generates considerable heat and exerts pressures upon the surrounding casing. Accordingly, most such machines have been furnished with casing cooling jackets; and, in order to prevent damage to the rotor screw journals or excessive leakage of tailings or powders, the shaft member portions emerging from the discharge end of the casing have been provided with elaborate thrust bearings and shaft seals, usually of a spring-biased floating dust ring design. Furthermore, to reduce frictional backpressure or sticking or scorching of the stocks at the orifice, it has been necessary in prior art machines to provide heating or cooling jackets or porting arrangements, and associated temperature controls, surrounding the discharge orifice passageway.

The dust rings have proven unsatisfactory in terms of maintenance, short service life, and inefficiency; and other types of shaft seals or packings have inordinately increased the backpressure effects near the adjacent discharge orifice. Also, certain older concepts for providing shaft seals or packing have entailed expensive precision machining of the journal portions of the hard steel rotor shafts.

In like manner, the necessity for providing elaborate heating and cooling means and controls in the discharge orifice passageway or output head assembly has engendered additional expense and problems in construction and maintenance of such machines, as well as in adverse effects upon product quality caused by faulty operation of such systems.

It is therefore a principal object of the present invention to provide an improved and inexpensive discharge end construction for machines of the class described, furnishing improved efficiency and operational reliability.

It is a further object of the invention to provide a discharge end construction, as aforesaid, having an improved orifice assembly which requires no extrinsic heating or cooling means.

It is another object of the invention to provide such a construction having an improved discharge orifice passageway exhibiting optimum product flow capabilities and thereby significantly reducing frictional backpressure in the machine and attendant product defects.

It is still another object of the invention to furnish a discharge end construction for such machines embodying an improved shaft seal insert assembly cooperatively co-acting with the improved discharge orifice assembly to reduce leakage of tailings and the like, while at the same time minimizing backpressure.

All these and other objects and advantages of the present invention will be apparent from the accompanying drawings and following detailed description of a preferred embodiment of the invention, it being understood that variations, changes, and substitution of equivalent components and structural details are comprehended within the scope and spirit of the invention.

In the drawings, in which like reference characters designate like assemblies and parts throughout:

The present invention generally comprises a discharge end construction for a machine of the class described embodying an extruder-action shaft seal insert and bushing assembly on each rotor of the machine and an adjacent discharge orifice assembly having a passageway therethrough defined by interior surfaces composed of thermosetting plastic bearing material.

Figure 1:
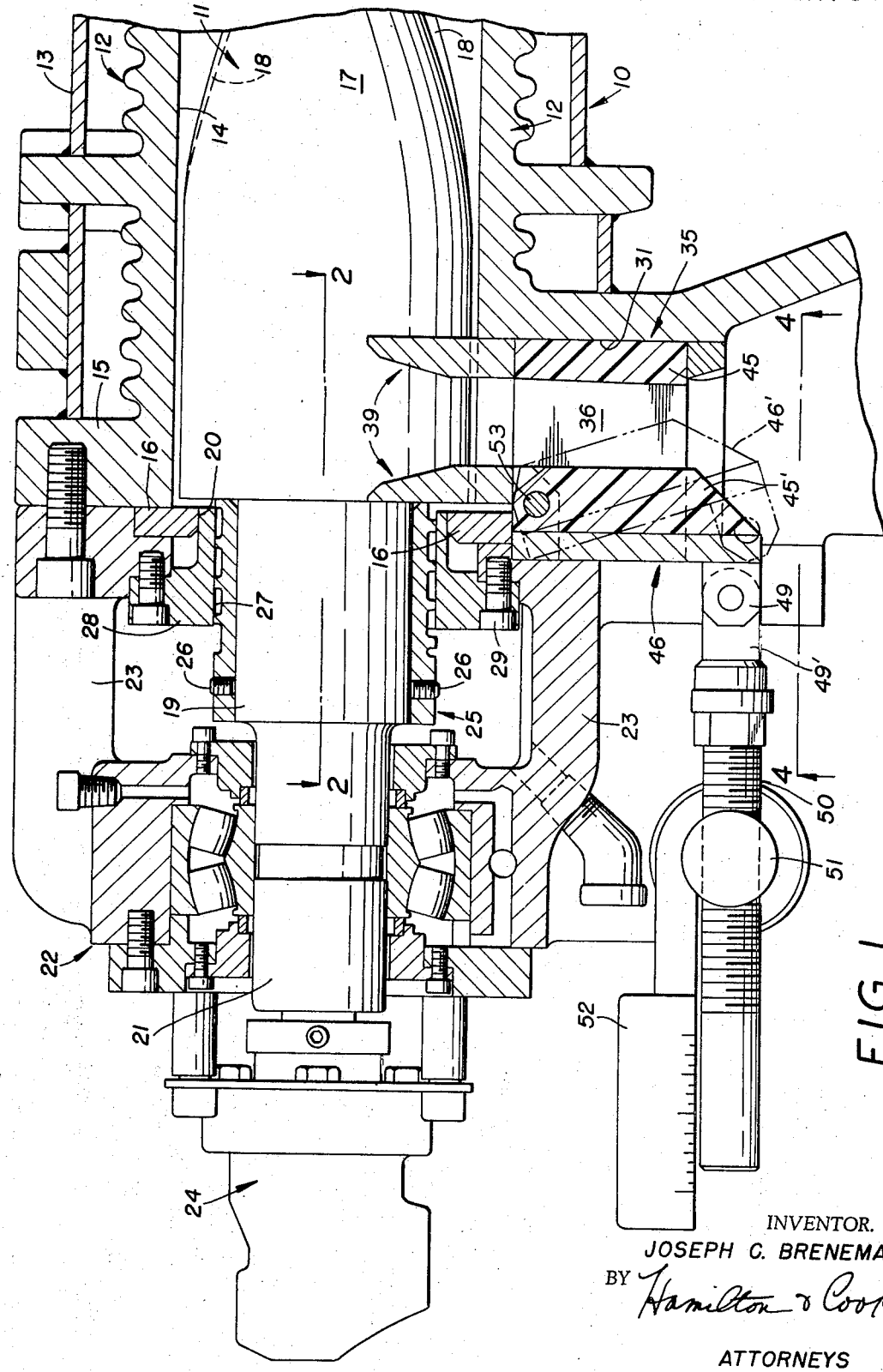
FIG. 1 is a partial sectional elevational view of the discharge end of a continuous mixer, according to the present invention.
Figure 2:
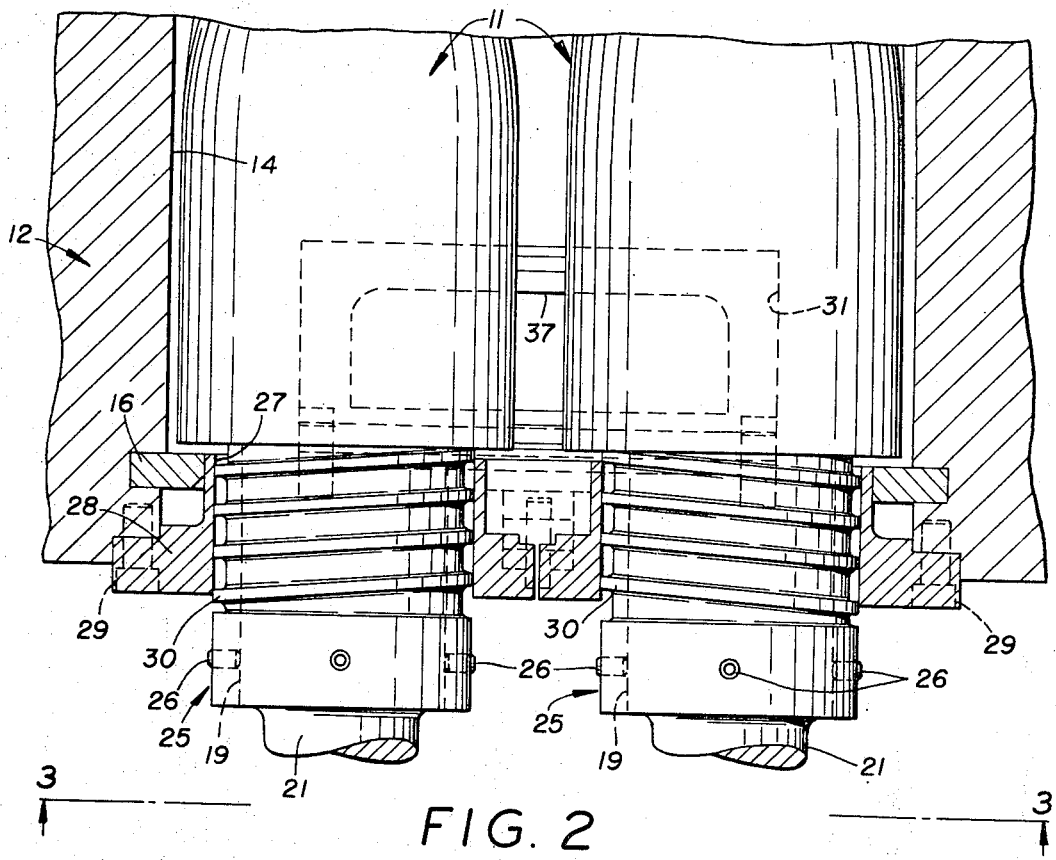
FIG. 2 is a plan sectional view taken substantially on line 2—2 in FIG. 1, the preferred embodiment being depicted in an environment wherein the machine employs a pair of side-by-side rotor members, though the inventive improvements hereinafter described may be utilized in single rotor machines.

Referring generally to FIGS. 1 and 2, a continuous mixer 10 usually comprises a pair of side-by-side rotatable stock-working shaft members 11, operatively disposed within a heavy-walled cast or fabricated casing 12 which commonly has a cooling jacket 13. The stock-working shaft members 11 are normally coupled, for opposite rotation of each, to gear reducer and motor drive means (not shown) at the feed box or raw materials charging end of the machine (also not shown).

The casing 12 has interior surfaces defining a plenum chamber 14 surrounding the stock-working shaft members 11, and the casing 12 terminates at the machine discharge end in a flange portion 15 against which an end plate 16 registers to enclose the end of the plenum chamber.

Each stock-working shaft member 11 is formed into a rotor screw portion 17 having screw flights 18 on the exterior surfaces thereof to convey or extrude the stock through the plenum chamber 14. Each rotor screw portion 17 integrally joins with a reduced-diameter journal neck portion loosely extending through a bore 20 in the end plate 16. Each journal neck portion 19 integrally joins with the terminates in a still further reduced diameter stub shaft journal portion 21 journaled in a pillow block spherical roller bearing assembly 22 carried outboard of the discharge end of the casing 12, as by a bearing bracket assembly or casting 23.

Each rotating shaft member 11 is also preferably drilled interiorly, or otherwise provided with an interior cooling cavity, into which a cooling medium such as cold water is supplied, as by a rotary piping joint assembly 24 fitted on then end of the stub shaft journal portion 21.

Figure 3:
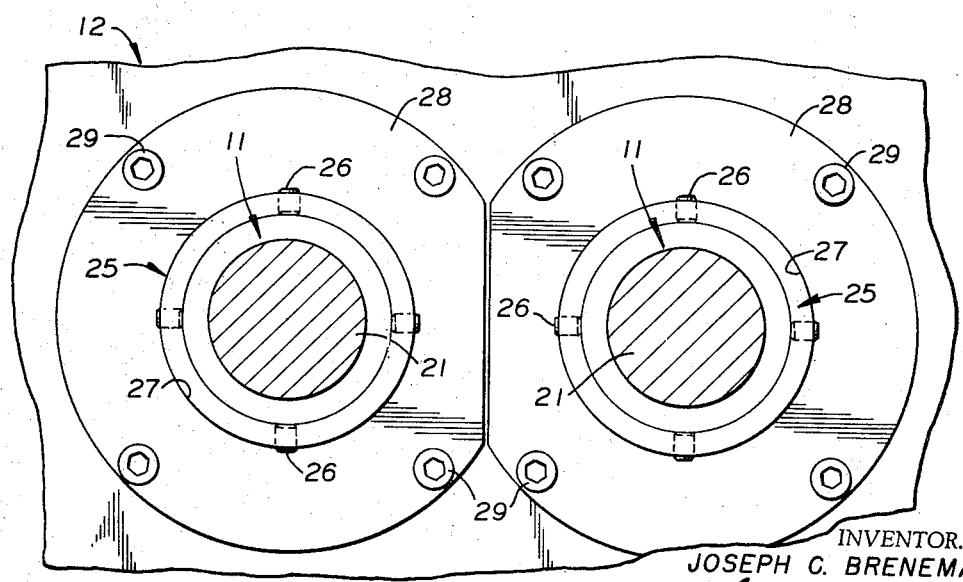
FIG. 3 is an exterior end view on line 3—3 of FIG. 2 of the assembled parts shown therein.
Figure 4:
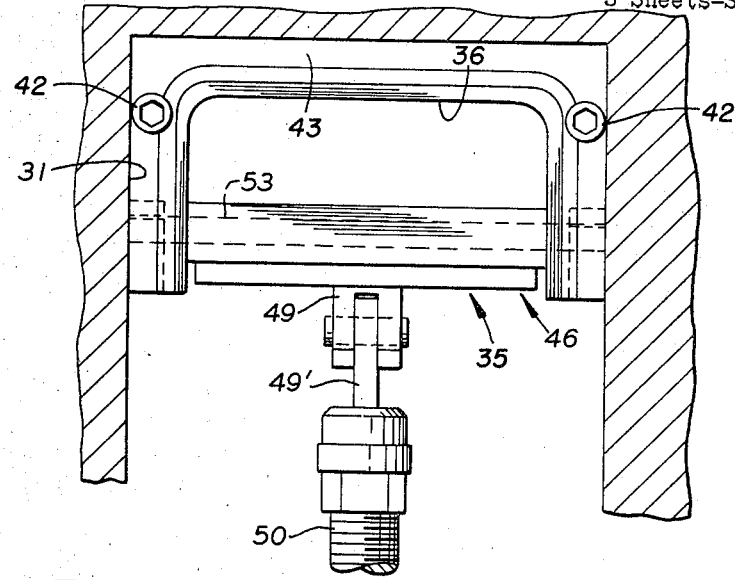
FIG. 4 is a view taken along line 4—4 in FIG. 1, the resultant view having been rotated through 90° counter-clockwise for purposes of convenience in illustration.

Referring particularly to FIGS. 1, 2, and 3, an improved shaft seal sleeve insert 25 is preferably fitted over the journal neck portion 19 and retained thereon, as by set screws 26. The sleeve insert 25, thus mounted on the journal neck portion 19, rides within a bore 27 defined by a bushing 28, inserted in close fit in the bore 20 of the end plate 16 and retained on the end of the casing 12, as by cap screws 29.

As best shown in FIG. 2, the shaft seal sleeve insert 25 has screw flights 30 formed on the exterior surfaces which ride in the bore 27 of the bushing 28. The screw flights 30 are pitched such that the rotation of the sleeve insert 25 with the shaft journal neck portion 19 cooperates with the bore 27 in the bushing 28 to produce a continuous conveying or extruding action inwardly toward the casing 12, whereby tailings, powders, dusts, oils, and the like which tend to escape from the plenum chamber 14 are retained therein.

As an example of an efficient preferred embodiment of the improved shaft seal arrangement for one machine having a nominal rotor size or rating of 4", the sleeve insert 25 and bushing 28 are composed of a hard steel, such as a chrome-molybdenum alloy (e.g., S.A.E. 4140 grade). The bushing race or bore 27 is flash chromed all over, and the screw flights 30 are likewise treated and polished. The total diametral clearance between the outer diameter of the screw flights 30 and the bore 27 may be between .020" and .027"; and the screw flights are preferably ⅛" deep by ⅛" wide on a ½" pitch spacing.

Adjacent or near the improved shaft seal sleeve inserts 25, there is an opening 31 through the casing 12 and into the plenum chamber 14, the opening 31 being illustrated as generally radially oriented with respect to the rotor screws 17 and laterally positioned generally medially of the rotor screws 17.

The opening 31 is dimensioned and adapted to receive an improved unitary discharge orifice assembly, designated generally in FIGS. 1, 2, 4, and 5 by the numeral 35. The orifice assembly 35 is preferably removable for maintenance, and is retained in place in the opening 31 during operation of the machine 10 by conventional bolts or clamping means (not shown).

Figure 5:
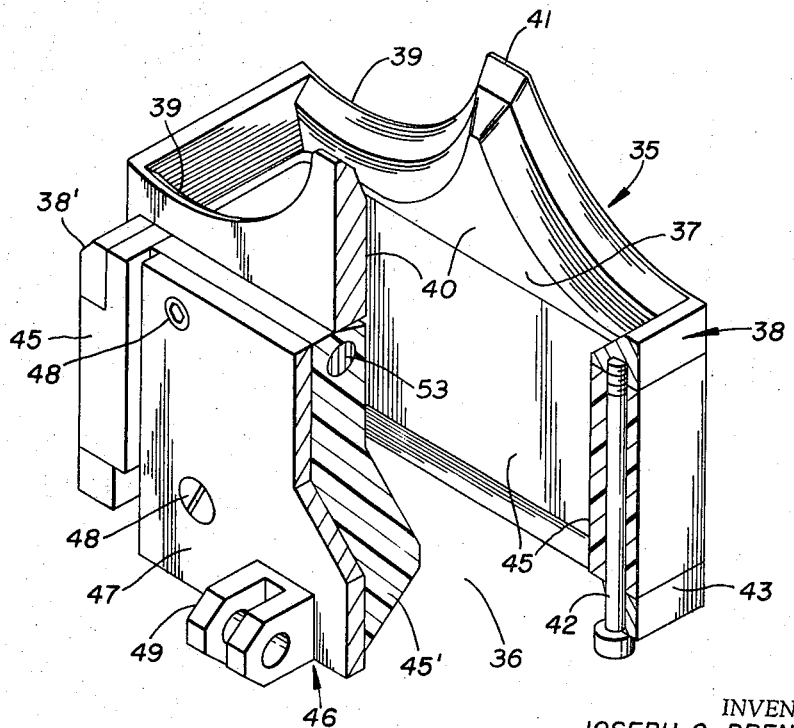
FIG. 5 is an isometric view, partially in section, of an improved discharge orifice assembly according to the present invention.

Referring particularly to FIGS. 1 and 5, the discharge orifice assembly 35 may be constructed generally in the form of a rectangular box, open at the open and bottom to define a discharge orifice passageway 36 therethrough. An orifice entrance aperture 37 is defined at the top of the box-shaped orifice assembly 35 by an orifice entrance border member 38 of chrome-plated hard steel or other suitable metal. The entrance border member 38 is integrally formed with upstanding opposing, and spaced-apart plow plates 39 having base regions 40 at their lower ends and apex or plowshare portions 41 at their upper ends. The plow plates 39 are generally triangular in shape, except that the upstanding sidewalls thereof are contoured to conform closely to the side-by-side rotor screws 17 when the orifice assembly 35 is operatively mounted in the casing 12 with the apex or plowshare regions 41 of the plow plates 39 disposed between the rotor screws 17.

The plow plates are also suitably contoured or streamlined in the vicinities thereof leading into the orifice entrance aperture 37 so as to minimize backpressure or drag of the stock being discharged.

Joined to the bottom of the entrance border member 38, as by long bolts 42 through a three-sided rectangular bottom retaining ring 43 of steel or other metal, are a plurality of peripheral side wall members 45 forming and defining an orifice discharge passageway.

The peripheral side wall members 45 are preferably composed of, or coated on their interior surfaces with, a thermosetting plastic bearing material. Such material is more properly defined as a thermoplastic material because, although it is made by heat-setting, it softens or becomes plastic if again subjected to a high enough temperature. The material is chosen, according to the type of stock being processed, temperatures, pressures, and other operational factors, so as to afford an optimum combination of characteristics of low thermal conductivity, high temperature deformation resistance, low coefficient of friction, and inertness to attack by most chemicals. For example, types of suitable material include certain fluorocarbon resins (e.g., Teflon or tetrafluoroethylene) and polyamide resins (e.g., nylon). In a continuous mixer for crumb rubber or rubber particles as described above, Teflon solid block stock is preferred as sidewalls.

The discharge orifice assembly 35 is also preferably constructed so that one of the peripheral side wall members 45′ is pivoted at its upper end, as by a hinge 53 journaled in entrance border member extensions 38′. Thus, the hinged wall member 45′ comprises part of an orifice gate assembly 46 which may be adjusted, as shown by the chain-line position 46′ in FIG. 1, so as to furnish variable constriction or size of the discharge orifice and outlet.

The gate assembly 46 is formed by a clevis plate 47 backing the hinged wall member 45′ and attached thereto, as by screws 48. The clevis plate 47 has a clevis 49′ thereon pinned to a tongue 49 on a threaded adjustment shank 50. The adjustment shank 50 is carried in threaded engagement in a bore in a bracket 51 attached to the bracket 22 or otherwise secured to the machine casing 12. The bracket 51 also preferably carries a calibrated template 52 to facilitate accuracy of adjustment of the orifice gate 46.

It is apparent from the foregoing detailed description and illustration of one preferred embodiment of the invention that the stated objects, purposes, and advantages of the invention may be attained by the invention described herein. However, reasonable and obvious equivalents and variants will occur to those skilled in the art. It is, therefore, appropriate and proper that the present invention be measured solely by the appended claims.

What is claimed is:

1. In a continuous mixer for rubber particles and the like, a casing, a pair of side-by-side bushings in one end of said casing defining a pair of side-by-side bores therethrough, a pair of rotor screws operatively disposed within said casing in side-by-side relation, a journal neck on one end of each said rotor extending through each said bore and terminating in a journal stub shaft, a discharge orifice entrance border member in said end of said casing generally medially of said bushings, said entrance border member defining a discharge orifice entrance outwardly from the casing and having a pair of spaced-apart opposing plow plates each with an inner apex portion and an outer base portion, said apex portions disposed between said rotor screws, peripheral orifice side members joined to said entrance border member and extending outwardly therefrom to define an extension of said discharge orifice outwardly of said casing, and an outer retaining ring abutting said side members and connected to said entrance border member, one of said side members being hinged to said entrance border member to vary the size of said discharge orifice extension, and said side members being of thermoplastic material having a low coefficient of friction with respect to the material discharged from the mixer regardless of temperature variations.

2. In a continuous mixer as defined in claim 1, wherein the thermoplastic material is a fluorocarbon resin.

3. In a continuous mixer as defined in claim 1, wherein the thermoplastic material is a polyamide resin.

4. In a continuous mixer as defined in claim 1, wherein the thermoplastic material is tetrafluoroethylene.

5. In a continuous mixer for rubber particles and the like, a casing, a pair of side-by-side bushings in one end of said casing defining a pair of side-by-side bores therethrough, a pair of rotor screws operatively disposed within said casing in side-by-side relation, a journal neck on one end of each said rotor extending through each said bore and terminating in a journal stub shaft. a discharge orifice entrance border member in said end of said casing generally medially of said bushings, said entrance border member defining a discharge orifice entrance outwardly from the casing and having a pair of spaced-apart opposing plow plates each with an inner apex portion and an outer base portion, said apex portions disposed between said rotor screws, said plow plate having curved laterally inwardly beveled surfaces between said apex portions and said outer base portions, peripheral orifice side members joined to said entrance border member and extending outwardly therefrom to define an extension of said discharge orifice outwardly of said casing, and an outer retaining ring abutting said side members and connected to said entrance border member, and of said side members being hinged to said entrance border member to vary the size of said discharge orifice extension, and said side members being of thermoplastic material having a low coefficient of friction with respect to the material discharge from the mixer regardless of temperature variations.

References Cited

UNITED STATES PATENTS

| | | |
|---|---|---|
| 2,403,476 | 7/1946 | Berry et al. |
| 2,604,662 | 7/1952 | Bodkin. |
| 2,617,269 | 11/1952 | Smith-Johannsen. |
| 2,803,851 | 8/1957 | Baulich et al. |
| 3,023,455 | 3/1962 | Geier et al. |
| 3,069,727 | 12/1962 | Shramek _____ 22—194 |
| 3,127,457 | 3/1964 | Di Pinto. |
| 3,154,808 | 11/1964 | Ahlefeld et al. _____ 18—2 |
| 3,278,986 | 10/1966 | Welt _____ 18—12 |

WILLIAM J. STEPHENSON, *Primary Examiner.*

UNITED STATES PATENT OFFICE

CERTIFICATE OF CORRECTION

Patent No. 3,349,432                  October 31, 1967

Joseph C. Breneman

It is hereby certified that error appears in the above numbered patent requiring correction and that the said Letters Patent should read as corrected below.

Column 3, line 11, for "the" read -- and --; line 20, for "then" read -- the --; line 64, for "open", second occurrence, read -- top --; column 6, line 6, for "and" read -- one --; line 18, for "Baulich et al." read -- Baunlich et al. --.

Signed and sealed this 25th day of March 1969.

(SEAL)
Attest:

Edward M. Fletcher, Jr.                EDWARD J. BRENNER
Attesting Officer                      Commissioner of Patents